(12) United States Patent
Frohna

(10) Patent No.: US 9,344,375 B2
(45) Date of Patent: May 17, 2016

(54) METHOD FOR TRANSMITTING DATA PACKETS BETWEEN TWO COMMUNICATION MODULES AND COMMUNICATION MODULE FOR TRANSMITTING DATA PACKETS, AS WELL AS COMMUNICATION MODULE FOR RECEIVING DATA PACKETS

(71) Applicant: Michael Frohna, Sachsenheim (DE)

(72) Inventor: Michael Frohna, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 256 days.

(21) Appl. No.: 14/078,142

(22) Filed: Nov. 12, 2013

(65) Prior Publication Data

US 2014/0133295 A1  May 15, 2014

(30) Foreign Application Priority Data

Nov. 14, 2012  (DE) .......................... 10 2012 220 784

(51) Int. Cl.
*H04L 12/801* (2013.01)
*H04L 12/927* (2013.01)
*H04L 12/851* (2013.01)
*H04W 28/02* (2009.01)
*H04W 84/12* (2009.01)

(52) U.S. Cl.
CPC ................ *H04L 47/35* (2013.01); *H04L 47/12* (2013.01); *H04L 47/245* (2013.01); *H04L 47/805* (2013.01); *H04W 28/0268* (2013.01); *H04W 28/0289* (2013.01); *H04W 84/12* (2013.01)

(58) Field of Classification Search
CPC .................................................... H04L 47/245
USPC .......................... 370/230, 248, 389, 401, 412
See application file for complete search history.

(56) References Cited

U.S. PATENT DOCUMENTS

| 5,343,473 | A  | * | 8/1994 | Cidon | ................. | H04L 12/6418 370/465 |
| 5,675,807 | A  | * | 10/1997 | Iswandhi | ......... | G01R 31/31727 710/260 |
| 6,633,564 | B1 | * | 10/2003 | Steer | .................... | H04L 12/2801 370/389 |
| 6,798,789 | B1 | * | 9/2004 | Jackson | ................... | G06F 13/24 370/389 |
| 2002/0041592 | A1 | * | 4/2002 | Van Der Zee | ..... | H04W 72/1242 370/389 |
| 2002/0089927 | A1 | * | 7/2002 | Fischer | ..................... | H04L 1/08 370/229 |
| 2002/0152315 | A1 | * | 10/2002 | Kagan | ..................... | H04L 49/90 709/228 |
| 2006/0092836 | A1 | * | 5/2006 | Kwan | ..................... | H04L 47/10 370/229 |
| 2006/0104268 | A1 | * | 5/2006 | Lee | ......................... | H04L 45/00 370/389 |
| 2006/0109864 | A1 | * | 5/2006 | Oksman | .................. | H04L 7/041 370/474 |

(Continued)

*Primary Examiner* — Andrew Lai
*Assistant Examiner* — Andrew C Lee
(74) *Attorney, Agent, or Firm* — Norton Rose Fulbright US LLP

(57) ABSTRACT

A method for transmitting data packets between two communication modules via a transmission medium interconnecting the two modules. To transmit a high-priority data packet in real time via the transmission medium, without causing erroneous transmissions of other packets, it is provided that, for an ongoing transmission of a first data packet, a transmitting communication module embeds a second data packet, which is to be sent urgently, directly into the ongoing first packet, buffers a remainder (not transmitted yet) of the first packet and transmits the remainder of the first packet after transmitting the second packet, and a receiving communication module buffers a beginning of a received first packet, receives the second packet and forwards it for further processing, and receives the remainder of the first packet after receiving the second packet, connects it with the buffered beginning of the first packet, and forwards the complete first packet for further processing.

21 Claims, 8 Drawing Sheets

(56) References Cited

U.S. PATENT DOCUMENTS

| | | | |
|---|---|---|---|
| 2007/0195761 A1* | 8/2007 | Tatar | H04L 49/1546 370/389 |
| 2007/0230493 A1* | 10/2007 | Dravida | H04L 47/14 370/412 |
| 2009/0219942 A1* | 9/2009 | Peeters | H04L 41/0896 370/412 |
| 2009/0268660 A1* | 10/2009 | Agarwal | H04L 1/0041 370/316 |
| 2011/0142052 A1* | 6/2011 | Kulkarni | H04L 47/245 370/392 |
| 2011/0261814 A1* | 10/2011 | Matthews | H04L 47/6215 370/389 |
| 2012/0218914 A1* | 8/2012 | Tanaka | H04L 1/1874 370/253 |
| 2012/0327950 A1* | 12/2012 | Gotz | H04L 47/245 370/412 |
| 2013/0201996 A1* | 8/2013 | Masputra | H04L 47/60 370/412 |

* cited by examiner

METHOD FOR TRANSMITTING DATA PACKETS BETWEEN TWO COMMUNICATION MODULES AND COMMUNICATION MODULE FOR TRANSMITTING DATA PACKETS, AS WELL AS COMMUNICATION MODULE FOR RECEIVING DATA PACKETS

RELATED APPLICATION INFORMATION

The present application claims priority to and the benefit of German patent application no. 10 2012 220 784.8, which was filed in Germany on Nov. 14, 2012, the disclosure of which is incorporated herein by reference.

FIELD OF THE INVENTION

The present invention relates to a method for transmitting data packets between two communication modules via a transmission medium which interconnects the two communication modules. The present invention also relates to a communication module for transmitting data packets to another communication module via a transmission medium which interconnects the two communication modules. Finally, the present invention also relates to a communication module for receiving data packets from another communication module via a transmission medium which interconnects the two communication modules.

BACKGROUND INFORMATION

A plurality of various packet-oriented data transmissions is believed to be understood from the related art. One example of such a data transmission is transmitting data with the aid of an Ethernet connection. The present invention is, however, not limited to an Ethernet communication connection, but also applies analogously for any type of packet-oriented communication connections. The communication modules of a packet-oriented communication connection include transceivers (so-called packet transceivers) for transmitting and receiving data packets. A transmission path includes a device for controlling the access to the transmission medium (so-called media access controller, MAC). The transmission medium may be configured as a cable, for example. It is, however, also conceivable that the transmission medium is also configured as an optical fiber for optically transmitting the data packets or as a wireless transmission medium for transmitting the data packets via a wireless or an optical connection (e.g., an infrared connection). The transmission medium is operated by a device for implementing a bit transmission layer (a so-called physical interface, PHY layer). The PHY has a specified data interface (e.g., a media independent interface, MII; gigabit media independent interface, GMII; etc.) on the MAC side and a corresponding transmission interface on the side toward the transmission medium. On the physical plane of the PHY, an error recognition may also be implemented, among other things, in which a PHY displays to the MAC errors upon reception of data packets. In the case of Ethernet, certain values are specified for the minimum interval between two data packets (the so-called interframe gap).

The MAC processes the packets sequentially in an Ethernet. This results in data packets which are sent by the packet transceiver with high priority not being processed by the MAC until the transmission medium is free in the transmission direction. Subsequently, such a data packet with the desired high priority or desired low transmission latency is referred to as a "fast packet (FP)."

In the case of the packet-oriented communication connections known from the related art, the FP is transmitted immediately in the case of a free transmission medium and accordingly received without great delay by the receiving communication module. If, however, a data packet is presently being sent, the transmission of the FP is delayed until the transmission medium is free again. The duration of this delay is essentially a function of:

the residual size of the just processed (i.e., transmitted) data packet,
the bit transmission rate via the transmission medium, and
the length (the number of data bits) of the FP data packet.

The residual size of a data packet may correspond to the maximally possible data packet size in extreme cases. The higher this value, the longer the transmission (and thus the reception) of an FP may be delayed. For example, the maximum delay period in an Ethernet (maximum packet length of 1522 bytes) is approximately 124 μs, taking into account the interframe gaps (in the case of a transmission rate of 100 MBit/sec) and 12.4 μs (in the case of 1000 MBit/sec), respectively. Such relatively long latency periods are unacceptable in particular for the transmission of high-priority FPs which is often triggered by an occurring event, since the occurrence of the event should be communicated to the receiving communication module as rapidly as possible.

One alternative method, which is also known from the related art, for transmitting high-priority FPs may include a data packet just sent being aborted prior to its complete transmission and the FP being immediately transmitted. It is believed that this may result, however, in two undesirable effects:

the abortion of the data packet just sent results in erroneous packets in the communication network. The quality of the actual data transmission can thus no longer be unambiguously evaluated, since erroneous packets on the receiver side cannot be ascribed exclusively to communication issues. The cause for the transmission error can thus not be ascertained without additional information.
erroneous data packets must be received by the "packet transceiver" of the receiving communication module and the data packet just sent, the transmission of which was aborted, must be transmitted once again by the transmitting communication module. In this way, the load on the packet transceiver is increased, since it must process more data packets. The repeated transmission of the aborted data packets reduces the usable band width of the communication connection, thus increasing the collision probability. The number of collisions is a function of the frequency of FPs and the frequency of packets having normal priority.

SUMMARY OF THE INVENTION

With reference to the described related art, the present invention has the object of enabling a possibly latency-free transmission of high-priory data packets in a network for packet-oriented data transmission, without increasing the number of erroneous data packets in the network and thus reducing the effective data transmission rate.

To achieve this object, it is proposed with reference to the method described at the outset for transmitting data packets that, in the case of an ongoing transmission of a first data packet, a transmitting communication module embeds a second data packet, which is to be sent urgently, directly into the ongoing first data packet, buffers a remainder (not transmitted yet) of the first data packet and transmits the remainder of the first data packet after transmitting the second data packet, and that a receiving communication module buffers a beginning of a received first data packet, receives the second data packet and forwards it for further processing, and receives the remainder of the first data packet after receiving the second data packet, connects it with the buffered beginning of the first data packet, and forwards the complete first data packet for further processing.

The present invention makes it possible to transmit urgent or high-priority data packets (so-called fast packets, FPs) immediately and in real time from one participant (transmitting communication module) to another participant (receiving communication module) in a packet-oriented network, while maintaining minimum transit time jitter of the FPs. The transit time jitter is in this case independent of the "normal" data packet transport according to the particular protocol specification according to which the data packets are transmitted in the network.

If, for example, the Ethernet is presumed as the transmission system, the following transmission times result for the transmission of an FP having 2 bytes of useful data:
Ethernet bit rate of 100 MBit/sec: approximately 0.8 μs,
Ethernet bit rate of 1000 MBit/sec: approximately 0.4 μs.

The transit time jitter as a quality standard for real time is a function of the transmission time and is, for example:
Ethernet bit rate of 100 MBit/sec: approximately 0.12 μs (compared to the related art: 123.4 μs),
Ethernet bit rate of 1000 MBit/sec: approximately 0.024 μs (related art: 12.4 μs).

The data apply for a first-time transmission of one "fast packet." For the transmission of subsequent "fast packets" having the same characteristic, the following may be settled on: The occurrence of two "fast packets" has a time interval which corresponds at least to the transmission time of a "fast packet," since the transmission time of the second "fast packet" would otherwise be prolonged by the transmission of the first "fast packet" occurring at the time. For fast packets having 2 bytes of useful data, for example, this results in a minimum interval between two fast packets of approximately 0.8 μs (in Ethernet 100 MBit/sec) and of approximately 0.4 μs (in Ethernet 1000 MBit/sec), respectively. In most cases, such a settlement does, however, not represent any restrictions and may be made in this form for many applications.

To implement this settlement, the transmission of another FP is simply postponed until the transmission of the previous FP is completed.

This also results in the FPs being as small as possible in order to allow the time interval between two such FPs to be kept as short as possible in case a possibly high FP frequency should be achieved.

Due to the buffering of the first data packets aborted as a result of the transmission of the fast packet, it is achieved that the transmission of normal data packets is not disrupted. The transmission of these data packets does not have to be aborted. These data packets also do not have to be completely retransmitted after the transmission of the FP. In this way, the full band width of the transmission medium may be used for transmitting "normal" packets and FPs.

"Normal packets" are here understood to mean all packets which are not high-priority "fast packets" which are to be transmitted immediately.

The method according to the present invention, for example, allows not only the following applications via an Ethernet, occurring events being transmitted as FPs:
detecting events in a communication module, transmitting these events in the form of FPs to one or multiple receivers. The receivers are situated in one or multiple other module(s). This causes an activity (e.g., measured data detection) in the receiver(s). The activity may be triggered simultaneously in multiple connected receivers (within the scope of the indicated transit time jitter). With the aid of the present invention, the occurrence of an event may be transmitted in real time from a transmitting communication module to a receiving communication module, without the need for additional, separate lines being present. Instead, the transmission medium, which is present anyway in the form of an Ethernet connection, for example, is used for communicating the occurrence of the event.

transmission of requests to which the transmitter (transmitting communication module) expects a rapid response. The response is transmitted from the receiver (the receiving communication module) to the transmitter via the same method.

periodic transmission of events, a rate being derivable from the event periodicity, which ultimately corresponds to a frequency transmission. This may, for example, be used for synchronizing a clock in the receiver (the receiving communication module) with the clock of the transmitter (the transmitting communication module) in such a way that the clock of the receiver is continuously counted at the received rate pulse (or a variable derived therefrom), and the data of the events are used in order to transmit time information, for example.

Advantageous specific embodiments of the present invention are claimed in the subclaims.

Additional features and advantages of the present invention are explained in greater detail in the following on the basis of the figures. The present invention is, however, not limited to the exemplary embodiments shown in the figures. Instead, the present invention extends within the scope of the claims also to such exemplary embodiments which only have a few of the features and advantages of the exemplary embodiments shown in the figures and/or include the features and advantages of the different exemplary embodiments in combination.

DETAILED DESCRIPTION

The present invention is elucidated in greater detail below with reference to an Ethernet communication connection. The present invention is, however, not limited to the Ethernet. Instead, the present invention may be used for any type of packet-oriented communication connections, in particular the use of the present invention within the scope of GPRS, UMTS, IP, ATM networks or other packet-transmitting networks is conceivable.

Figure 7:
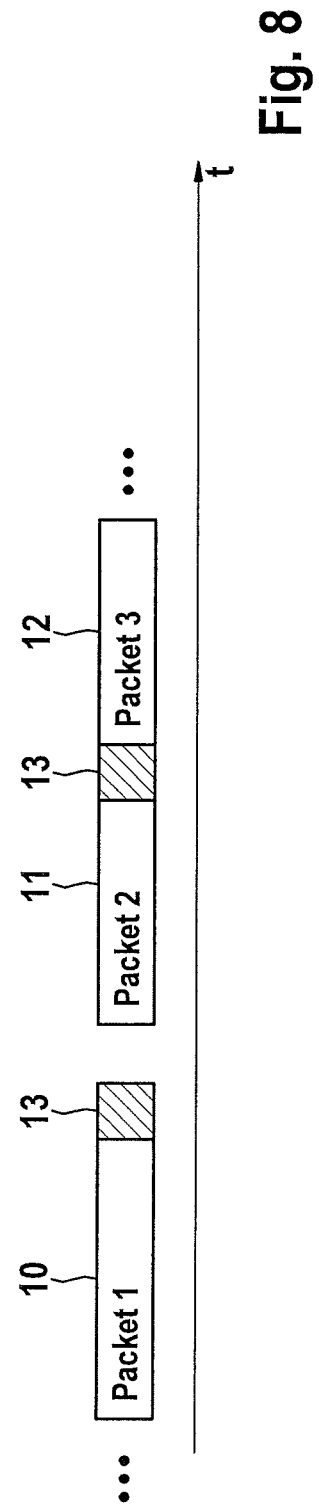
FIG. 7 shows a block diagram of a bidirectional packet-oriented communication connection known from the related art.

FIG. 7 shows a typical Ethernet connection known from the related art. This figure and the following figures and descriptions also apply analogously to other packet-oriented communication connections. The communication connection includes a transmitting communication module 1 as well as a receiving communication module 2 which are interconnected via a transmission medium 3. Communication modules 1, 2 are referred to here as transmitting and receiving only for explanation reasons. Naturally, communication module 2 is also capable of transmitting data packets and communication module 1 is capable of receiving data packets. In the illustrated exemplary embodiment, transmission medium 3 is configured as a cable. Naturally, transmission medium 3 may also be configured as an optical connection or as a wireless connection (e.g., IR connection).

Communication modules 1, 2 each have a transceiver device 4 (a so-called packet transceiver) for transmitting and/or receiving data packets. The transmission path includes a device 5 for controlling the access to transmission medium 3 (a so-called media access controller, MAC). Transmission medium 3 is operated by a device 6 for implementing a bit transmission layer (a so-called physical interface, PHY). A packet interface for receiving or transmitting data packets is symbolized with a dashed line 7 between packet transceiver 4 and MAC 5. On the MAC side, PHY 6 has a specified data interface 8 which is configured as an MII, GMII or the like, for example. On the side of transmission medium 3, PHY 6 has a corresponding transmission interface 9. On the physical plane of PHY 6, an error recognition may also be implemented, among other things, using which PHY 6 may display to MAC 5 errors upon reception of data packets.

Figure 8:
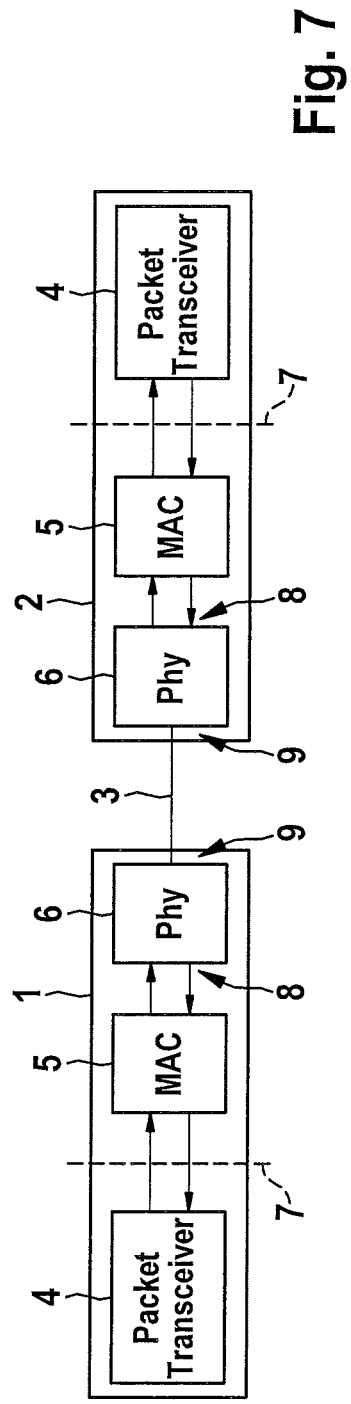
FIG. 8 shows the sequences on the known communication connection according to FIG. 7 for transmitting data packets.

In an Ethernet, (pre)defined values are specified for the minimum interval between two data packets 10, 11, 12 (cf. FIG. 8), the so-called interframe gap (IFG). In FIG. 8, the IFG or the minimum interval between two consecutive data packets 10, 11, 12 is denoted with reference numeral 13.

Figure 9:
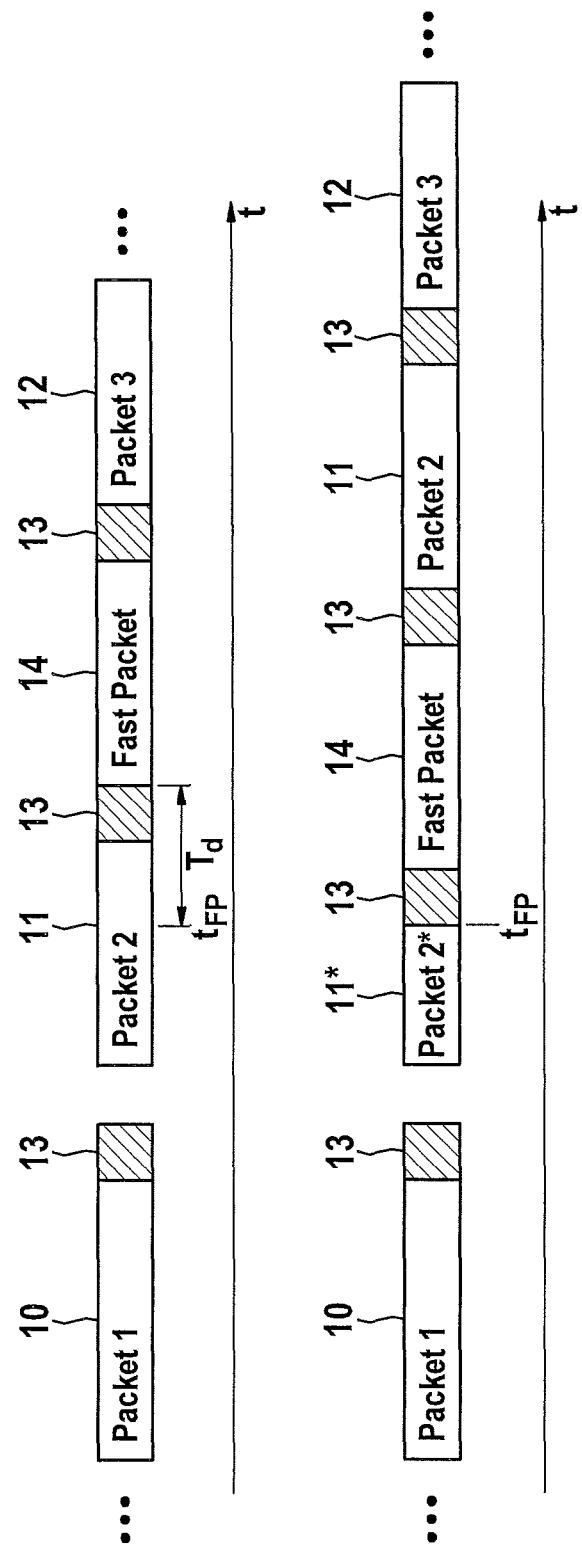
FIG. 9 shows one example of a chronological behavior of the transmission of a fast packet via the communication connection according to FIG. 7 from the related art.

MAC 5 processes data packets sequentially. This results in data packets which are sent by packet transceiver 4 not being processed by MAC 5 until transmission medium 3 is free in the transmission direction. In particular, this also applies to data packets which have a high priority. In FIG. 9, such a data packet with the desired high priority or desired low transmission latency is referred to as a "fast packet (FP)" 14. If transmission medium 3 is free, FP 14 is transmitted immediately and received by its counterpart (receiving communication module 2) accordingly in real time.

If, however, a data packet, e.g., packet 11, is presently being sent, which occupies transmission medium 3, the transmission of FP 14 is delayed until transmission medium 3 is free again (cf. FIG. 9, top). This is where the point in time at which FP 14 is available for transmitting is denoted with $t_{FP}$ and the delay due to occupied transmission medium 3 is denoted with $T_d$. Delay $T_d$ is essentially a function of:

the residual size of just processed data packet 11,
the bit transmission rate via transmission medium 3, and
the length (number of data bits) of FP 14.

The residual size of data packet 11 may correspond to the maximally possible packet size in extreme cases. The higher this value, the longer the transmission (and thus the reception) of an FP 14 may be delayed. For example, the maximum delay in a conventional Ethernet (maximum size of data packets 1522 bytes) is approximately 123.4 μs (at 100 MBit/sec) and approximately 12.4 μs (at 1000 MBit/sec), respectively.

One alternative method, which is also known from the related art, for transmitting a high-priority FP 14 may include the incomplete abortion of a just sent "normal" data packet 11 and the transmission of FP 14 (in compliance with the requirement for IFG 13 insofar as the transmission protocol used requires an IFG 13) directly following the aborted data packet 11* which was sent only incompletely (cf. FIG. 9, bottom). In FIG. 9, bottom, the point in time at which an FP 14 is formed and thus is available for a data transmission is denoted with $t_{FP}$. The alternative method illustrated in FIG. 9, bottom, however, has two essential disadvantages:

the abortion of data packet 11* results in erroneous data packets in the network. The quality of the actual transmission can thus no longer be unambiguously determined, since erroneous data packets on the receiving side (in receiving communication module 2) cannot be ascribed exclusively to communication issues.

erroneous data packets 11* must be received by packet transceiver 4 on receiving side 2, and data packet 11 must be retransmitted completely from the transmitting side (transmitting communication module 1). In this way, the load on packet transceiver 4 is increased, since it must process more data packets 11*, 11. The repeated transmission of a data packet 11*, 11 reduces the usable bandwidth of the communication connection, thus increasing the collision probability. The number of collisions is a function of the frequency of the occurrence of FPs 14 and the frequency of data packets 10, 11, 12 having "normal" priority.

The transmission of data packets shown symbolically in FIG. 9 takes place in FIG. 7 in transmitting module 1 and receiving module 2 between MAC 5 and PHY 6, respectively.

Figure 10:
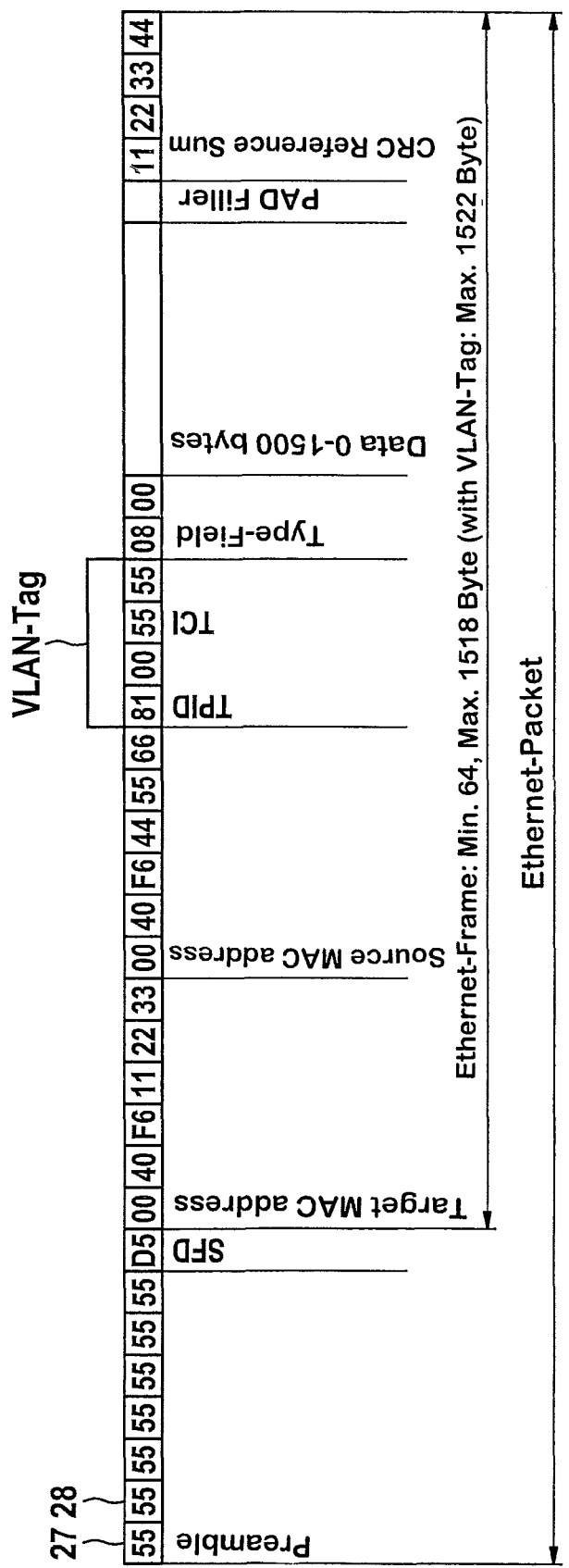
FIG. 10 shows one example of an Ethernet data block format Ethernet II according to IEEE 802.3 from the related art.

One example for a "normal" data packet 10, 11, 12 which is awaiting transmission in the packet-oriented communication connection is explained in greater detail in FIG. 10 with reference to an Ethernet packet. Data packets used in other transmission protocols may differ therefrom. An Ethernet data frame (so-called Ethernet frame) forms together with a prefixed preamble (e.g., 7 bytes) and a so-called start frame delimiter (SFD) (e.g., 1 byte) the Ethernet packet. Ethernet packets always start with a preamble including multiple bytes having the value 0x55 and an SFD field having the value 0xD5. The Ethernet frame includes a target MAC address (e.g., 6 bytes or 48 Bit) which identifies communication module 2 which is designated to receive the data packet. The source MAC address (e.g., 6 bytes or 48 Bit) identifies transmitting communication module 1. In a so-called tagged MAC frame according to IEEE 802.1 q, 4 bytes follow additionally as a VLAN (virtual local area network) tag. A subsequent type field (e.g., 2 bytes) provides information regarding the used protocol of the next higher layer within the useful data. This is followed by the useful data, a maximum of 1500 bytes of useful data being transmitted per data packet. The useful data are interpreted by the protocol indicated in the type field. The useful data are followed by a so-called PAD filler which is used to adjust the Ethernet frame to the minimum size of 64 bytes, if necessary. In this case, the preamble and SFD (8 bytes) are not incorporated into the ascertainment of the necessary minimum length of the frame, but a potentially present VLAN tag is. A PAD field is thus necessary if less than 46 or 42 bytes (with or without 802.1 q VLAN tag) are to be transmitted. At the end of the Ethernet packet, a frame check sequence (FCS) is ultimately provided which contains a CRC reference sum (e.g., 4 bytes). The CRC reference sum is computed across the actual frame, i.e., starting with the target MAC address and ending with the PAD filler. The preamble, the SFD, and the FCS themselves are not taken into account in the CRC reference sum. Basically, data packets whose structure deviates from that of the described Ethernet packet may be used for a data transmission in other transmission protocols.

Figure 1:
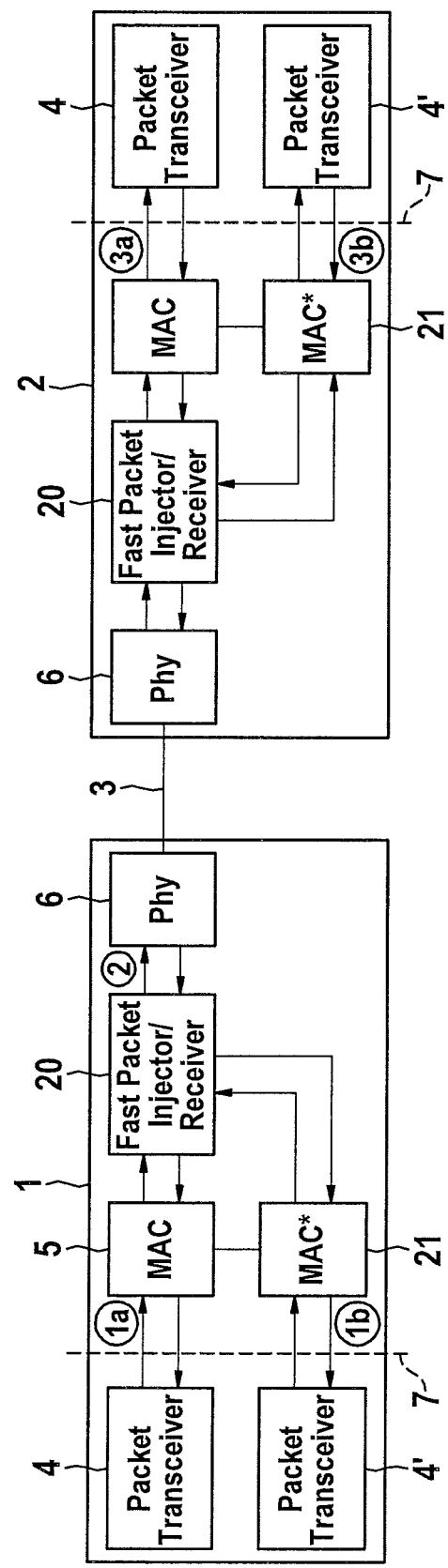
FIG. 1 shows a block diagram of a bidirectional packet-oriented communication connection for implementing the method according to the present invention.

In contrast to the packet-oriented communication connection shown in FIG. 7 and known from the related art, communication modules 1, 2 of the communication connection according to the present invention from FIG. 1 each have an additional function block "fast packet injector/receiver" 20 which is situated between MAC 5 and PHY 6. This function block 20 has another interface to a function block 21 denoted with MAC* which, for example, represents an additional device for controlling the access to transmission medium 3. Function block 20 is logically to be considered to be a part of the MAC layer, but it cannot be associated with it unambiguously. Function block 21 may be an integral part of MAC 5 or may be configured separately therefrom. Furthermore, communication modules 1, 2 according to the present invention each have an additional transceiver device 4' (a so-called packet transceiver) for transmitting and/or receiving data packets which are connected to additional MAC* 21 via packet interface 7 for receiving or transmitting data packets. The two packet transceivers 4, 4' of each communication module 1, 2 may be implemented as one unit or separately from one another. For the subsequent explanation and better understanding, a completely separate path is, however, shown here for additional MAC* 21 and additional packet transceiver 4'.

The method according to the present invention presumes that the two communication modules 1, 2 which are involved in data transmission in the sense of the present invention have the same functional extensions ("fast packet injector/receiver" 20, "MAC*" 21, and "packet transceiver" 4'). In this way, it is possible to implement a bidirectional connection between communication modules 1, 2. Naturally, it is also conceivable that, for example, only one "fast packet injector" is provided on transmitting side 1 and one "fast packet receiver" is provided on receiving side 2 during unidirectional operation.

MAC 5 is responsible, among other things, for serialization of data for PHY 6 in the transmitting direction. It, in turn, generates in the transmitting direction the data packets to be transmitted according to the communication protocol used for data transmission and generates, if provided according to the used protocol specification, a CRC reference sum for an error correction/recognition.

MAC* 21 essentially has the same function as MAC 5. One important difference is, however, that MAC* 21 does not necessarily generate the data packets according to the protocol specifications used for the data transmission, e.g., according to the Ethernet specification. Instead, FP 14 generated by MAC* 21 may also have a proprietary format. For this reason, it is also necessary that receiving communication module 2 has the same MAC* 21 or a MAC* 21 which is compatible with it, since receiving communication module 2 could accordingly process incoming FPs 14.

For this reason, it is also reasonable that a transmitting communication module 1 initially checks whether the hardware of receiving communication module 2 is at all capable of carrying out the method according to the present invention prior to interrupting an ongoing transmission of a data packet 11 in order to immediately transmit a high-priority data packet FP 14. The method proposed according to the present invention for transmitting high-priority data packets FP 14 may be only carried out when involved communication modules 1, 2, in particular receiving communication module 2, are capable of carrying out the method. If transmitting communication module 1 determines that receiving communication module 2 is not capable of carrying out the method (e.g., because it has a non-compatible MAC* 21), it may initiate the transmission of high-priority data packets FP 14 in the conventional manner described at the outset and known from the related art. Such a known data transmission would have the disadvantages of the related art mentioned at the outset, but at least a normal data transmission would be possible between communication modules 1, 2. A transmitting communication module 1, which is configured for implementing the method according to the present invention, could transmit high-priority data packets FP 14 in the manner according to the present invention, if the data to be transmitted are intended for a receiving communication module 2 which is capable of carrying out the method.

Those function blocks from FIG. 1, which are not explained explicitly and which have the same reference numerals as corresponding function blocks in FIG. 7, have an identical configuration and identical functions. Reference is made to the corresponding explanations with regard to FIG. 7.

Figure 2:
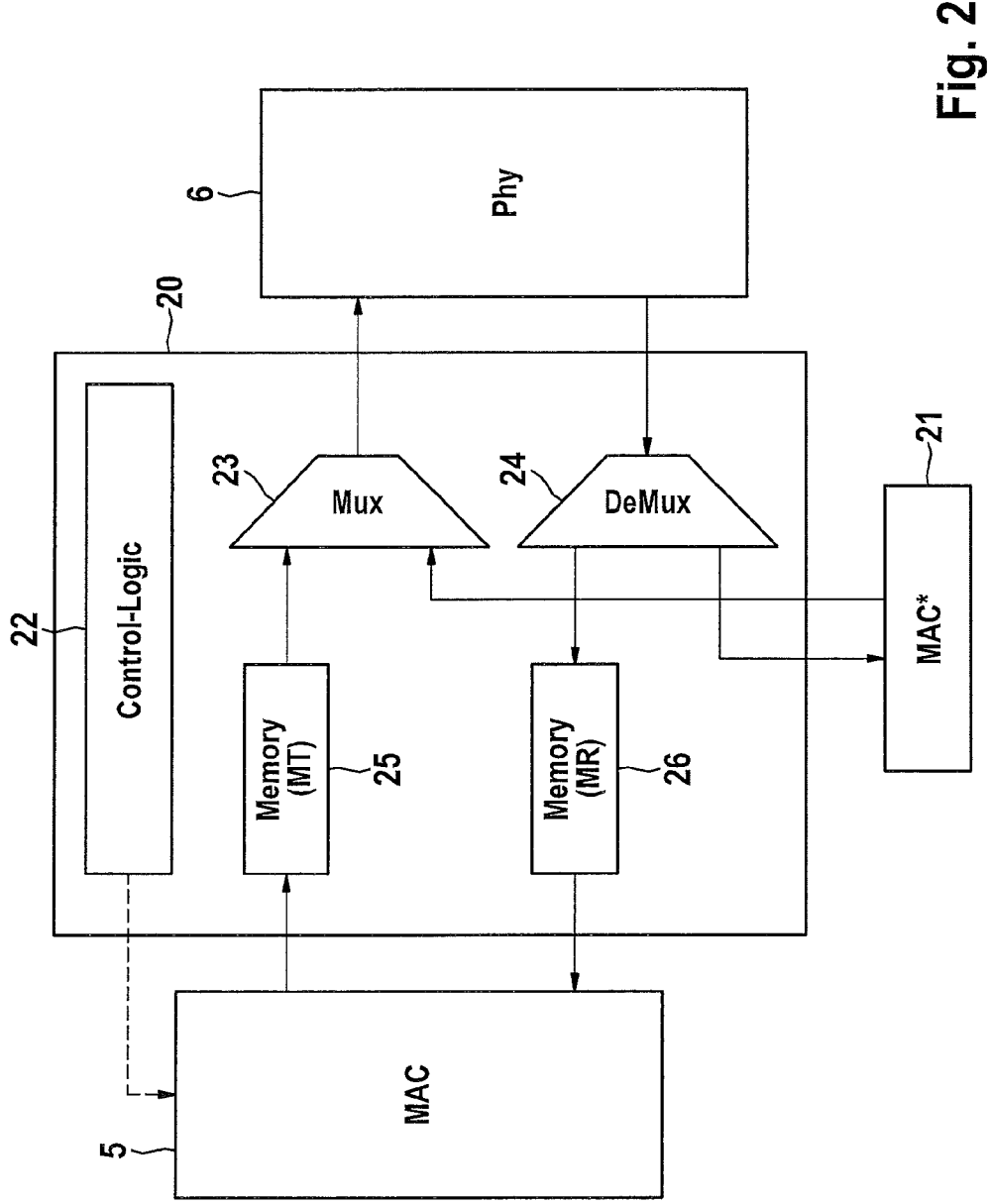
FIG. 2 shows a device for implementing the method according to the present invention as an integral part of a transmitting communication module and/or a receiving communication module of the communication connection from FIG. 1.

A function block "fast packet injector/receiver" 20 is illustrated in detail in FIG. 2. The inner structure of function block 20 includes a control unit 22 (control logic), a data multiplexer (Mux) 23 in the transmitting direction, and a data demultiplexer (DeMux) 24 in the receiving direction. At the packet interface to MAC 5, two buffers 25, 26 ("memory transceiver MT" and "memory receiver MR") are provided.

In principle, MAC 5 may be controlled by control unit 22 to reduce the MAC bandwidth in the transmitting path (cf. dashed-line arrow from control unit 22 to MAC 5 in FIG. 2). This may, for example, be necessary when large amounts of FPs 14 are transmitted and the data packet flow from MAC 5 to buffer 25 is to be interrupted. In this way, it is possible to keep a time interval between two consecutive FPs 14. The interval may, for example, correspond to at least the transmission time of one FP 14. Thereby, an extension of the transmission time of a second FP 14 due to the ongoing transmission of a first FP 14 may be avoided.

Device 6 for implementing a bit transmission layer (PHY) is controlled during the transmission of packets by control logic 22 in such a way that data packets 10, 11, 12, partial packets 11*, and fast packets FPs 14 may be differentiated by the receiver. For this purpose, a signal TX_EN of the MII/GMII interface may be used in order to indicate the beginning of a new packet 10, 11, 12, partial packet 11*, or FP 14 and thus to make partial packets identifiable for the receiver.

Function block 20 may have a hardware configuration and is implemented in the form of a so-called field programmable gate array (FPGA), for example. Particularly, at least control unit 22, multiplexer 23, and demultiplexer 24 are implemented as hardware, in particular as an FPGA. The parts of function block 20 which are implemented as hardware may be implemented as an integrated circuit or configured as programmable hardware. Function block 20 may in principle also be implemented as software.

Control unit 22 has the following tasks, in particular:
immediately transmitting a data packet FP 14 from MAC* 21 which is awaiting transmission,
controlling the internal elements, namely in particular multiplexer 23, demultiplexer 24, buffer 25, and buffer 26, and
controlling the packet flow to and from MAC 5 and to and from MAC* 21.

Subsequently, the transmitting mechanism of the communication connection according to the present invention is initially explained in detail. Here, two cases may be differentiated in principle:

1. There is no other data packet transmission (at point in time $t_{FP}$ of the completion of an FP 14 and its availability for transmission) (cf. FIG. 3). In this case, FP 14 may be transmitted immediately. If a normal data packet (e.g., data packet 11 in FIG. 3) is placed by MAC 5 during the transmission of FP 14, this normal data packet 11 is initially clocked into buffer 25. Buffer 25 may function as a FIFO (first in first out) memory. As soon as the transmission of high-priority data packet FP 14 is completed, control unit 22 ensures that normal data packet 11 is read out of buffer 25 and the data are forwarded to PHY 6 for transmission via transmission medium 3. In this case, it is conceivable that an interframe gap (IFG) 13 is not provided between FP 14 and data packet 11.

Figure 3:
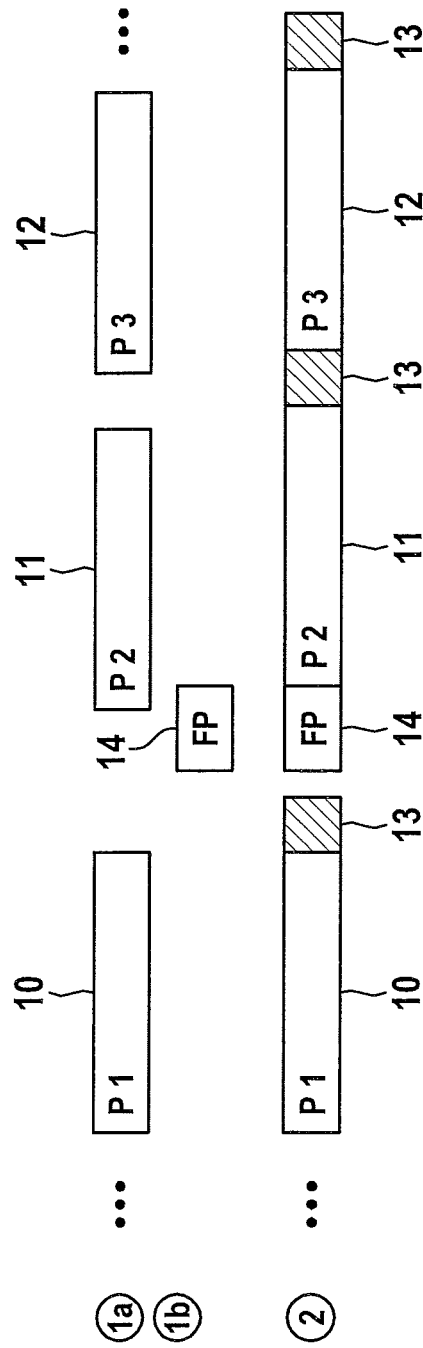
FIG. 3 shows an example of sequences for transmitting a fast packet via the communication connection from FIG. 1 according to one specific embodiment.

In FIG. 3, in addition to shown data packets 10, 11, 12, and 14, different numbers are indicated in a circle which refer to the corresponding numbers in the circle from FIG. 1 and are supposed to illustrate where in the communication connection or by which function blocks the individual data packets are made available and transmitted.

Figure 4:
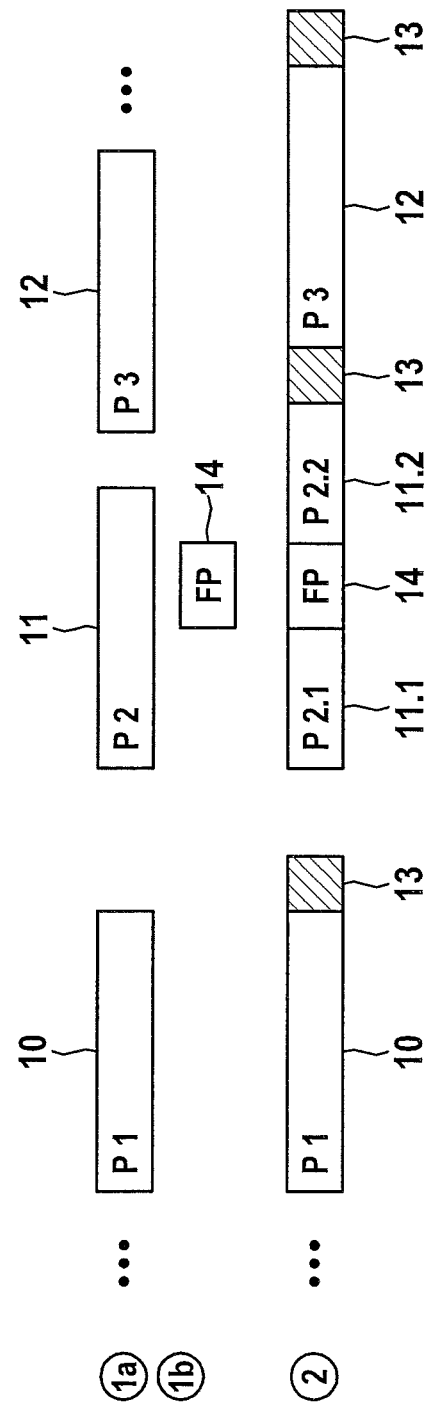
FIG. 4 shows an example of sequences for transmitting a fast packet via the communication connection from FIG. 1 according to another specific embodiment.

2. In a second case, an FP 14 is to be transmitted during a presently ongoing transmission of a normal data packet (e.g., data packet 11) (cf. FIG. 4). In this case, FP 14 is immediately embedded into ongoing normal data packet 11 by control unit 22. Reference numeral 11.1 refers to that part of data packet 11 which has already been transmitted at this point in time. While embedding FP 14, the remainder of data packet 11 (identified by reference numeral 11.2) is clocked into buffer 25. After the completion of the embedding and the transmission of FP 14, remainder 11.2 of data packet 11 is removed from buffer 25 and forwarded to transmission medium 3 via PHY 6.

It is conceivable that an FP 14 is embedded into remainder 11.2 of normal data packet 11 (not illustrated in FIG. 4), thus resulting in another packet part (which could, for example, be identified by 11.3). The rear packet parts (i.e., 11.2, 11.3, etc.) are added an identification field at the beginning of the partial packets during the transport via transmission medium 3, in order to make these partial packets 11.2, 11.3, etc., identifiable for receiving communication module 2 as the partial packets of data packet 11. This is elucidated in greater detail further below.

The embedding of FPs 14 and the adding of further partial packets (e.g., partial packets 11.2, 11.3, etc.) are controlled by control unit 22 in such a way that individual partial packets 11.2, 11.3, etc., are recognizable as independent blocks on receiving side 2 between PHY 6 and MAC 5. Therefore, control unit 22 in transmitter 1 must, for example, ensure during the use of an Ethernet that partial packets 11.2, 11.3, etc., are differentiable on receiving side 2 according to specification IEEE 802.3 based on signal RX_DV. The differentiation between received data regarding their packet type is denoted with the identification field in (partial) packet 10, 11, 12, or 11.1, 11.2, 11.3, etc.

One important aspect of the present invention is that function block MAC 5 of communication modules 1, 2 according to the present invention does exactly the same as that in the communication modules known from the related art. It transmits a complete data packet 11. It does not learn anything about the division of data packet 11 into partial packets 11.1 and 11.2. The method according to the present invention is therefore completely transparent for MAC 5 in the transmitting direction. The same naturally also applies to the receiving direction. Packet transceiver 4 and MAC 5 do not notice that the method according to the present invention is carried out, i.e., they may transmit and receive data packets as usual.

Figure 5:
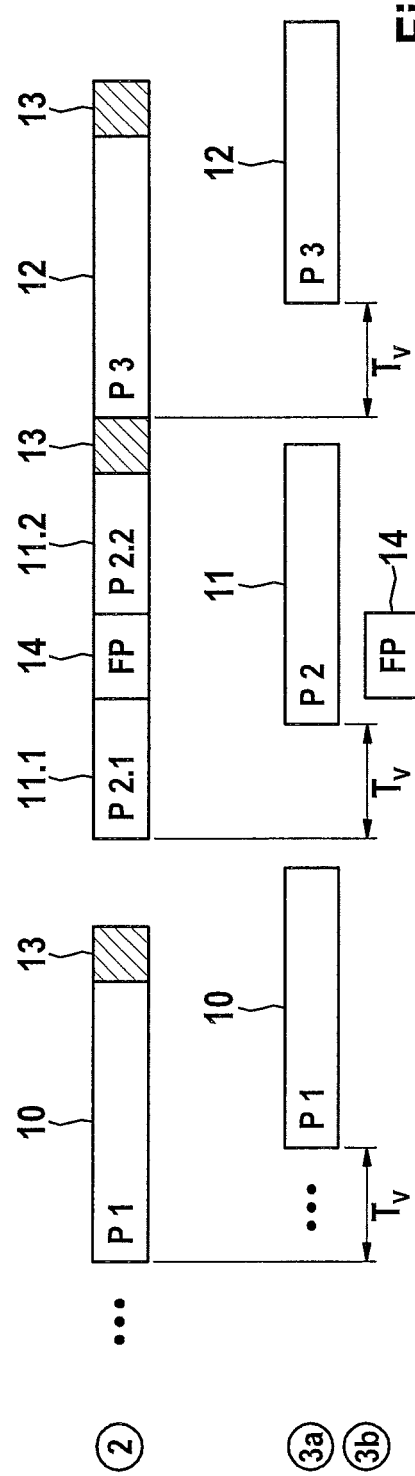
FIG. 5 shows an example of sequences for receiving a fast packet in the communication connection according to FIG. 1 according to one specific embodiment.

Subsequently, the receiving mechanism in receiving communication module 2 is explained in greater detail. Here, the second case explained above with reference to FIG. 4 is observed in which data packet 11 has been divided into two partial packets 11.1 and 11.2. Reference is made to FIG. 5 for illustrating the receiving mechanism. Control unit 22 of receiving communication module 2 ensures by accordingly controlling demultiplexer 24 that data packet parts 11.1, 11.2, etc., are supplied to buffer 26 and FP 14 is transferred outward and transmitted to MAC* 21. Buffer 26, which may also be implemented as a FIFO, plays a key role here. Control unit 22 recognizes based on the transmitted identification field of the (partial) packets whether the received data are the beginning of a new data packet 10, 11, 12, or another data packet part 11.2 of data packet 11 of which a data packet part 11.1 has already been received. In this way, control unit 22 is capable of writing received partial packets 11.1, 11.2, etc., into buffer 26 and of transmitting received data packet 11 as a whole to MAC 5 for further processing.

According to one possible embodiment of the present invention, buffer 26 additionally implements a delay function. This may, for example, be implemented by a FIFO having a delay function. Here, incoming data packets are not forwarded immediately to MAC 5, but the forwarding does not start until a delay period $T_v$ has elapsed (cf. FIG. 5). The size of buffer 26 results from necessary delay period $T_v$. The delay makes it possible for data packet 11 to be forwarded gaplessly, i.e., as a whole, to MAC 5. Delay period $T_v$ compensates for the occurrence of potentially transmitted FPs 14. Period $T_v$ is in this case to have the dimensions appropriate to the desired system configuration. The necessary value for $T_v$ is determined from the maximally possible frequency of FPs 14 and their length. One example of dimensioning for an Ethernet communication connection having a transmission rate of 1000 MBit/sec is indicated below:

The maximum size of a normal Ethernet packet is 1500 bytes, for example. This results in a transmission duration of 12 μs.

The transmitter (MAC* 21) has a possible maximum transmission characteristic of four FPs 14 in 12 μs.

One FP 14 includes maximally 10 bytes. This means that the delay of MAC packets on receiver side 2 must be configured for ≥40 bytes (4 FPs×10 bytes), i.e., buffer 26 must be capable of storing at least 40 bytes. This results in a delay period $T_v$ of 320 ns (40 bytes×8 Bits×1 ns).

MAC 5 on receiver side 2 does not notice the division of data packet 11 into partial packets 11.1, 11.2 on transmitter side 1 and the combination on receiver side 2. MAC 5 receives complete data packet 11 in one piece from function block 20. Here, too, the method according to the present invention is completely transparent for MAC 5 on receiver side 2.

To be able to differentiate FPs 14 from non-FPs (so-called "normal" data packets 10, 11, 12) on the receiver side, FPs may contain an FP identification. The FP identification may, for example, be formed as follows using the example of an Ethernet packet (cf. FIG. 10): Ethernet packets always start with a preamble (0x55) and an SFD field (0xD5). A value, which deviates therefrom, in the first byte(s) or in a part of the first byte may be used for identifying FPs 14. The first (alternatively also the second, the third, etc.) byte of the Ethernet packet may thus be used as an identification field for an FP 14.

Normal data packets which are not subdivided by embedded FPs 14, e.g., data packets 10, 12 in the examples described previously, which may be remain unchanged. Normal data packets which are transmitted by MAC 5 and subdivided due to the embedding of one or multiple FPs 14, e.g., data packet 11 into data packets 11.1, 11.2, etc., may, for example, be changed in the following manner for identification purposes:

partial data packet 11.1: unchanged, partial data packet 11.2 and all subsequent partial data packets: this partial data packet 11.2, etc., may be provided with an unambiguous identification in the first byte 27 (cf. FIG. 10) of the preamble (or also in the first two or more bytes 27, 28). This identification may differ in this case from 0x55, 0xD5 and from the identification for FPs 14. In this way, receiving communication module 2 is capable of reassigning these partial packets 11.2, etc., to a certain partial data packet 11.1 or data packet 11, so that this data packet 11 may be supplied as a whole to MAC 5 after different data packets 11.1, 11.2, etc., have been combined.

High-priority FPs 14 may contain any type of data. In particular, they may correspond to the Ethernet format or replicate CAN messages, for example.

Figure 6:
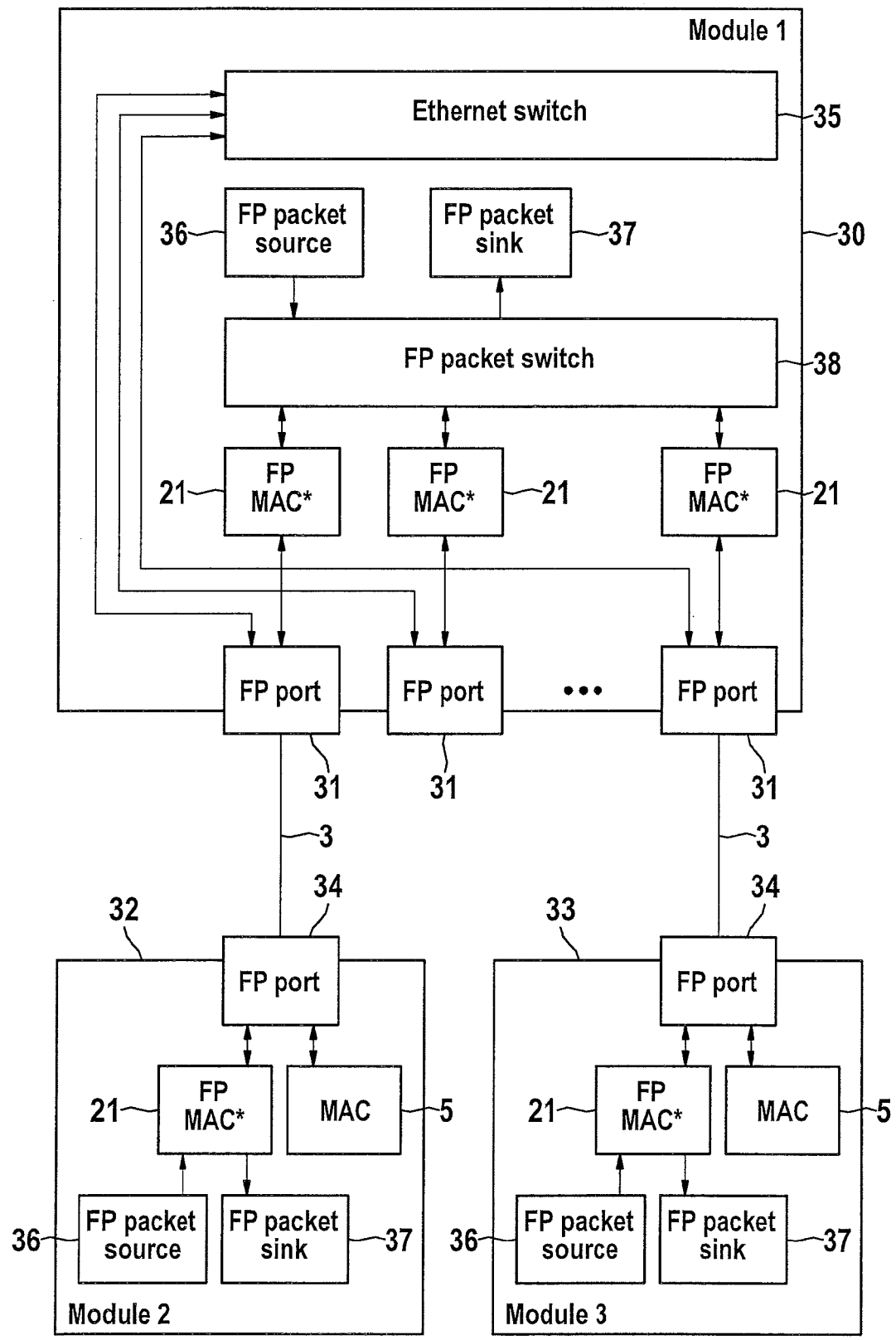
FIG. 6 shows a practical exemplary application of the present invention.

FIG. 6 shows a specific exemplary application of the present invention. Here, "FP port" 31 and 34 refers to an Ethernet connection which is configured according to the present invention. "FP packet source" 36 refers to a unit for generating FPs 14. "FP packet sink" 37 accordingly refers to a unit for receiving FPs 14. All function blocks, which relate to the method according to the present invention, are implemented as hardware/FPGA.

A first module 30 has multiple FP ports 31 and an Ethernet switch 35 for normal Ethernet packets 10, 11, 12. Second and third modules 32, 33 each have an FP port 34 and may therefore also be understood to be terminals. Normal Ethernet data packets 10, 11, 12 are transmitted/received via the particular MAC 5 of terminals 32, 33. The infrastructure lying behind them which uses the content of received FPs 14 or determines the content of transmitted FPs 14 is not illustrated in FIG. 6. For example, at least one arithmetic unit (CPU) may, however, be connected there. An FP packet switch 38 in first module 30 may be configured to be configurable in the sense that, depending on the content of a received FP 14, this content is forwarded to one or multiple FP port(s) 31 or also to FP packet sink 37.

According to a first possible exemplary embodiment, the present invention is used for detecting events in a module, e.g., first module 30, and for transmitting these events to one or multiple receivers, e.g., second module 32 and/or third module 33. Receivers 32; 33 are each situated in one or multiple module (s). The received event causes an activity, e.g., a measured data detection, in receiver(s) 32, 33. The activity may be triggered simultaneously in multiple connected receivers 32, 33 (within the scope of the indicated transit time jitter). One essential advantage here is that for the transmission of the events, separate lines do not have to be provided between modules 30, 32, 33, but Ethernet connections 3, which are present anyway, may be used.

First module 30, for example, has a button (not illustrated in FIG. 6). If this button is pressed by a user, this corresponds to the occurrence of an event and the transmission of an FP 14 is triggered ("measured data detection now"). FP packet switch 38 may be configured in such a way that it receives this FP 14 and sends it via all FP ports 31, so that FP 14 (within the scope of the indicated transit time jitter) is received simultaneously by all connected modules, e.g., second and third modules 32, 33. This enables a simultaneous detection of measured data in these modules 32, 33.

If a further module (not illustrated in FIG. 6) of the type of first module 30 were interconnected between first module 30 and third module 33, this further module forwarding FP 14 to third module 33, third module 33 would receive FP 14 later than second module 32. The transit time of FP 14 through such an additional interconnected module is very short and is maximally in the one-digit μs range. The transit time is not negligible, but it may be guaranteed. With the aid of the method proposed according to the present invention, the reception time for FPs 14 in a receiving communication module 2, e.g., in third module 33 from FIG. 6, may be predicted very precisely and guaranteed, even across multiple modules. If, for example, a delay by 5 μs of an FP 14 is expected in a module and a total of six such modules connected in series is assumed, the transport duration is maximally 30 μs up to the most remote point. This value may be guaranteed.

According to another proposed exemplary embodiment, orders or requests, to which transmitting communication module 1 expects a quick response, may be transmitted with the aid of the present invention through one or multiple FP(s) 14. According to the method according to the present invention, the response may also be transmitted as a high-priority FP 14 from receiving communication module 2 to transmitting communication module 1.

If, for example, first module 30 wants to detect the state of other modules 32, 33 very rapidly, first module 30 may transmit an FP 14 ("read state") simultaneously to second module 32 and third module 33. Modules 32, 33 receive this FP 14 in their "FP packet sink" 37 and may themselves send back an FP 14 "state=XY" directly to first module 30. By implementing function blocks 21, 31 and 34, 36, 37, 38 as hardware/FPGA, it is possible to keep the response times short.

According to another possible exemplary embodiment, a periodic transmission of events may be implemented with the aid of the present invention, a rate being derivable from the event periodicity, which ultimately corresponds to a frequency transmission. This may, for example, be used for synchronizing a clock in receiving communication module 2 with the clock of transmitter 1 in such a way that the clock of receiver 2 is continuously counted at the received rate pulse (or a pulse derived therefrom), and the data of the event are used in order to transmit time information.

Here, second module 32 is, for example, the timer of the system. Module 32 periodically transmits FPs 14 "time sync." For this purpose, the logic is implemented as hardware/FPGA and connected to FP packet source 36. The transmission period of FPs 14 may be derived from a local clock of module 32. One or multiple of FPs 14 "time sync" may additionally contain useful data, e.g., time information. The receiver logic at FP packet sink 37 of first module 30 and of third module 33 may derive the rate of the clock of second module 32 from the reception points in time of FPs 14, so that modules 30, 33 may use it to control their own clocks and correct them, if necessary, and thereby ensure that their own clocks run synchronously with the clock of second module 32. The time information additionally contained in the useful data of FPs 14 could then be used to set the time of first module 30 and third module 33. The time of receiving modules 30, 33 may thus be set to an absolute value with the aid of the useful data contained in FPs 14, whereas a relative correction of the time may take place with the aid of the reception point in time of FPs 14 or the pulse derived therefrom. Alternatively, second module 32 may also only control first module 30, and third module 33 may then be controlled by first module 30.

Apart from this special application for a clock synchronization, periodic events are suitable for various tasks: e.g., watchdogs, periodic detection of measured data, etc.

What is claimed is:

1. A method for transmitting data packets between two communication modules via a transmission medium, which interconnects the two communication modules, the method comprising:
   (a) embedding, via a transmitting communication module, in the case of an ongoing transmission of a first data packet, a second data packet, which is to be sent urgently, directly into the ongoing first data packet;
   (b) buffering a remainder, not transmitted yet, of the first data packet;
   (c) transmitting the remainder of the first data packet after transmitting the second data packet, wherein the transmitting of the remainder of the first data packet includes:
      providing, in a partial packet containing the remainder of the first data packet, a first identification field with a value that identifies the partial packet as being a partial packet that belongs to the first data packet, and
      providing, in the second data packet, a second identification field with a value that identifies the second data packet as being a high priority packet, wherein the value of the first identification field differs from the value of the second identification field; and
   (d) buffering, via a receiving communication module, a beginning of a received first data packet;
   (e) receiving the second data packet and forwarding the second data packet for further processing;
   (f) receiving the remainder of the first data packet after receiving the second data packet;
   (g) connecting the received remainder of the first data packet with the buffered beginning of the first data packet, therein forming a complete first data packet; and
   (h) forwarding the complete first data packet for further processing.

2. The method of claim 1, further comprising:
   prior to performing steps (a) to (h), checking as to whether hardware of the communication modules involved is at all suitable for performing steps (a) to (h), and wherein steps (a) to (h) are only performed if the communication modules are capable of performing steps (a) to (h).

3. The method of claim 1, wherein the received complete first data packet is forwarded for further processing at a predefined delay.

4. The method of claim 1, wherein the receiving communication module recognizes based on the value of the first identification field, that the partial packet contains the remainder of the first data packet.

5. The method of claim 1, wherein the data packets are formed according to the Ethernet specification and transmitted via the transmission medium.

6. The method of claim 5, wherein the first identification field is located in a preamble of the partial packet, wherein the second identification field is located in a preamble of the second data packet, wherein the first data packet includes a conventional preamble of an Ethernet data packet, and wherein the values of the first identification field and the second identification field deviate at least partially from the conventional preamble of an Ethernet data packet.

7. The method of claim 1, further comprising:
   periodically transmitting events via the transmitting communication module, wherein the second data packet corresponds to one of the events.

8. The method of claim 7, wherein the receiving communication module derives a rate from a periodicity of the events, based on reception of data packets corresponding to the events.

9. The method of claim 7, wherein the events are processed to synchronize a clock of the receiving communication module with a clock of the transmitting communication module.

10. The method of claim 7, wherein the events are processed to perform watchdog monitoring.

11. The method of claim 7, wherein the events are processed to periodically detect measured data.

12. A communication module for transmitting data packets to another communication module via a transmission medium, which interconnects two communication modules, comprising:
   a transmitting communication module having a buffer for buffering a first data packet to be transmitted or a remainder of the first data packet, not yet transmitted; and
   a multiplexer, situated between the buffer and the transmission medium, for switching the data to be stored for transmission via the transmission medium between the first data packet buffered in the buffer or the buffered remainder of the first data packet, not yet transmitted, and a second data packet to be urgently transmitted,
   wherein the communication module:
      provides, in a partial packet containing the remainder of the first data packet, a first identification field with a value that identifies the partial packet as being a partial packet that belongs to the first data packet, and
      provides, in the second data packet, a second identification field with a value that identifies the second data packet as being a high priority packet, wherein the value of the first identification field differs from the value of the second identification field.

13. The communication module of claim 12, further comprising:
   a transmitting device for the data packets;
   a device for controlling access to the transmission medium; and
   a device for implementing a bit transmission layer;
   wherein the buffer and the multiplexer are situated between the device for controlling the access to the transmission medium and the device for implementing a bit transmission layer.

14. The communication module of claim 12, further comprising:
   a transceiver device for the data packets;
   a buffer for the data packets to be transmitted;
   a second buffer for the received data packets;
   a multiplexer for the data to be transmitted; and
   a demultiplexer for the received data.

15. A communication module for receiving data packets from another communication module via a transmission medium, which interconnects the two communication modules, comprising:
   a receiving communication module having a buffer for buffering a received first data packet; and
   a demultiplexer, situated between the transmission medium and the buffer, for switching the data received via the transmission medium between the buffer for the first data packet and an arrangement for further processing a second data packet transmitted urgently via the transmission medium and received by the communication module, wherein the communication module is configured to:
- detect, in a partial packet containing a buffered remainder of the first data packet, a first identification field with a value that identifies the partial packet as being a partial packet that belongs to the first data packet, and
- detect, in the second data packet, a second identification field with a value that identifies the second data packet as being a high priority packet, wherein the value of the first identification field differs from the value of the second identification field.

16. The communication module of claim 15, further comprising:
- a receiving device for the data packets;
- a device for controlling the access to the transmission medium; and
- a device for implementing a bit transmission layer;

wherein the buffer and the demultiplexer are situated between the device for controlling the access to the transmission medium and the device for implementing a bit transmission layer.

17. The communication module of claim 16, wherein the device is integrated into an electronic component for implementing a bit transmission layer and an arithmetic unit, in the form of a central processing unit (CPU), of the communication module.

18. The communication module of claim 15, wherein the arrangement for further processing the second data packet, transmitted urgently via the transmission medium and received by communication module, are an integral part of the device for controlling the access to the transmission medium.

19. The communication module of claim 15, wherein the arrangement for further processing the second data packet, transmitted urgently via the transmission medium and received by communication module, are an integral part of the receiving device for the data packets.

20. The communication module of claim 15, further comprising:
- a transceiver device for the data packets;
- a buffer for the data packets to be transmitted;
- a second buffer for the received data packets;
- a multiplexer for the data to be transmitted; and
- a demultiplexer for the received data.

21. The communication module of claim 15, wherein the communication module is implemented as hardware, programmable hardware, in the form of a field programmable gate array (FPGA), or as software.

* * * * *